(12) United States Patent
Ates

(10) Patent No.: US 6,957,247 B1
(45) Date of Patent: Oct. 18, 2005

(54) INTERNET SYSTEM

(76) Inventor: Gorkem I. Ates, Mebusevleri Ergin Sok.21/11 06580, Ankara (TR)

( * ) Notice: Subject to any disclaimer, the term of this patent is extended or adjusted under 35 U.S.C. 154(b) by 440 days.

(21) Appl. No.: 09/401,221

(22) Filed: Sep. 22, 1999

(51) Int. Cl.[7] ............................................. G06F 15/16
(52) U.S. Cl. ..................... 709/203; 709/223; 709/225; 718/100; 370/409; 370/480
(58) Field of Search ................................ 709/225, 203, 709/223, 100; 370/409, 480

(56) References Cited

U.S. PATENT DOCUMENTS

| | | | |
|---|---|---|---|
| 5,463,735 A | | 10/1995 | Pascucci et al. |
| 5,636,371 A | * | 6/1997 | Yu ................................ 703/26 |
| 5,727,159 A | | 3/1998 | Kikinis |
| 5,754,857 A | | 5/1998 | Gadol |
| 5,774,660 A | * | 6/1998 | Brendel et al. ............. 709/100 |
| 5,774,668 A | * | 6/1998 | Choquier et al. ........... 370/480 |
| 5,862,344 A | | 1/1999 | Hart |
| 5,864,852 A | | 1/1999 | Luotonen ..................... 707/10 |
| 5,892,903 A | | 4/1999 | Klaus |
| 5,913,040 A | | 6/1999 | Rakavy et al. |
| 5,923,854 A | * | 7/1999 | Bell et al. .................... 370/409 |
| 6,003,032 A | * | 12/1999 | Bunney et al. ............... 707/10 |
| 6,038,602 A | * | 3/2000 | Ishikawa ..................... 709/227 |
| 6,070,191 A | * | 5/2000 | Narendran et al. ......... 709/226 |
| 6,108,703 A | * | 8/2000 | Leighton et al. ............ 709/226 |
| 6,119,078 A | * | 9/2000 | Kobayakawa et al. ......... 704/3 |
| 6,167,427 A | * | 12/2000 | Rabinovich et al. ........ 709/201 |
| 6,185,619 B1 | * | 2/2001 | Joffe et al. .................. 709/223 |
| 6,223,209 B1 | * | 4/2001 | Watson ........................ 709/201 |
| 6,304,913 B1 | * | 10/2001 | Rune ............................ 709/241 |
| 6,405,256 B1 | * | 6/2002 | Lin et al. ..................... 709/231 |
| 6,430,618 B1 | * | 8/2002 | Karger et al. ............... 709/225 |
| 6,446,109 B2 | * | 9/2002 | Gupta .......................... 709/203 |
| 6,553,420 B1 | * | 4/2003 | Karger et al. ............... 709/226 |
| 2001/0039565 A1 | * | 11/2001 | Gupta .......................... 709/203 |

* cited by examiner

*Primary Examiner*—Rupal Dharia
*Assistant Examiner*—Hai V. Nguyen
(74) *Attorney, Agent, or Firm*—Richard L. Miller

(57) ABSTRACT

An Internet system. The system includes a main server and at least one participant server. The main server stores information to be requested over the Internet by a client so as to form a request for information and has an IP address. The at least one participant server has an IP address and electrically communicates with the main server. The at least one participant server does not receive the request for information from the client, but rather the main server receives the request for information over the Internet from the client and requests over the Internet that the at least one participant server send the requested information over the Internet back to the client. If the at least one participant server does not have the requested information, the requested information is downloaded from the main server to the at least one participant server. When the at least one participant server sends the requested information over the Internet back to the client, the at least one participant server assigns to the requested information the IP address of the main server and not the IP address of the at least one participant server.

6 Claims, 6 Drawing Sheets

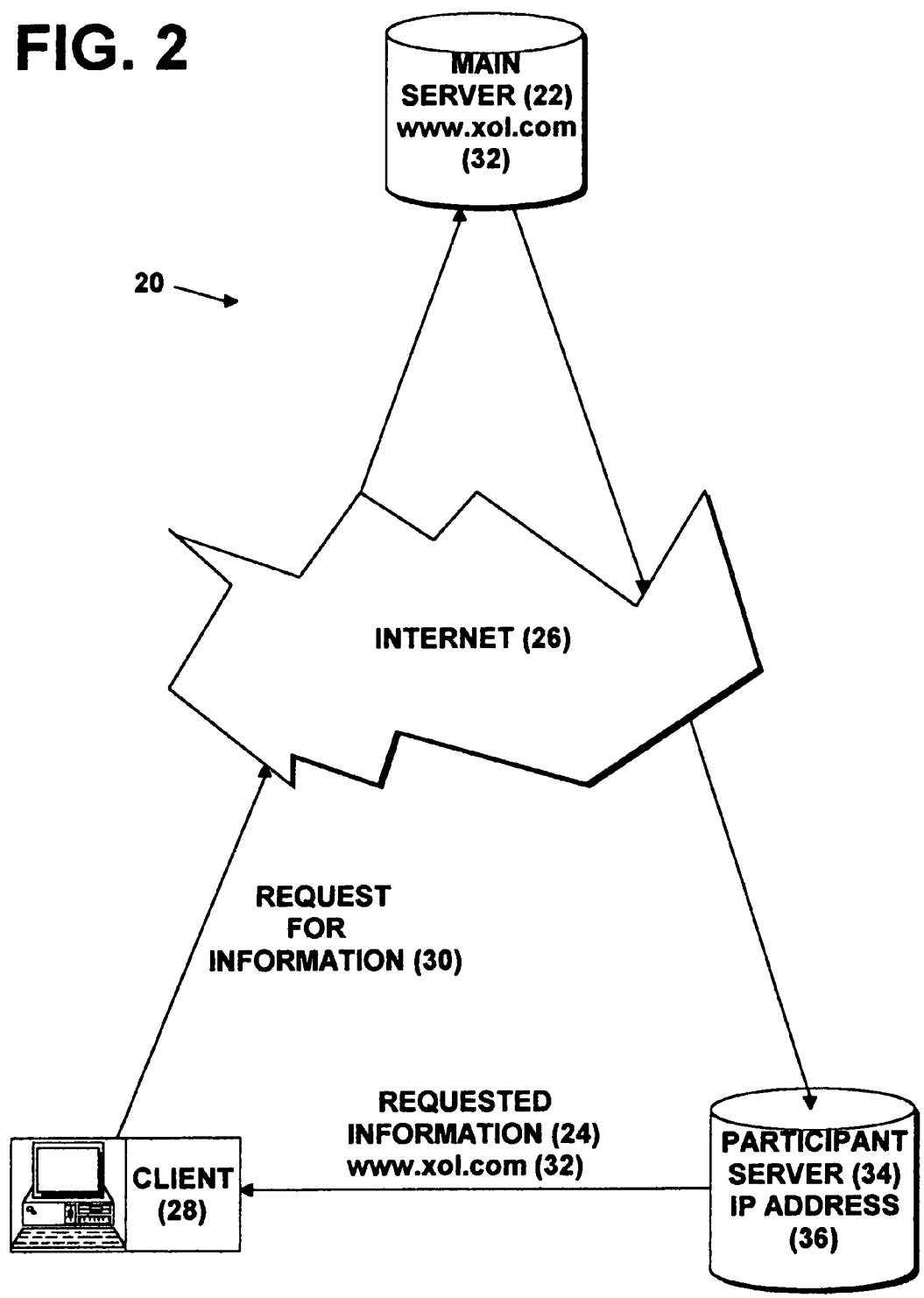

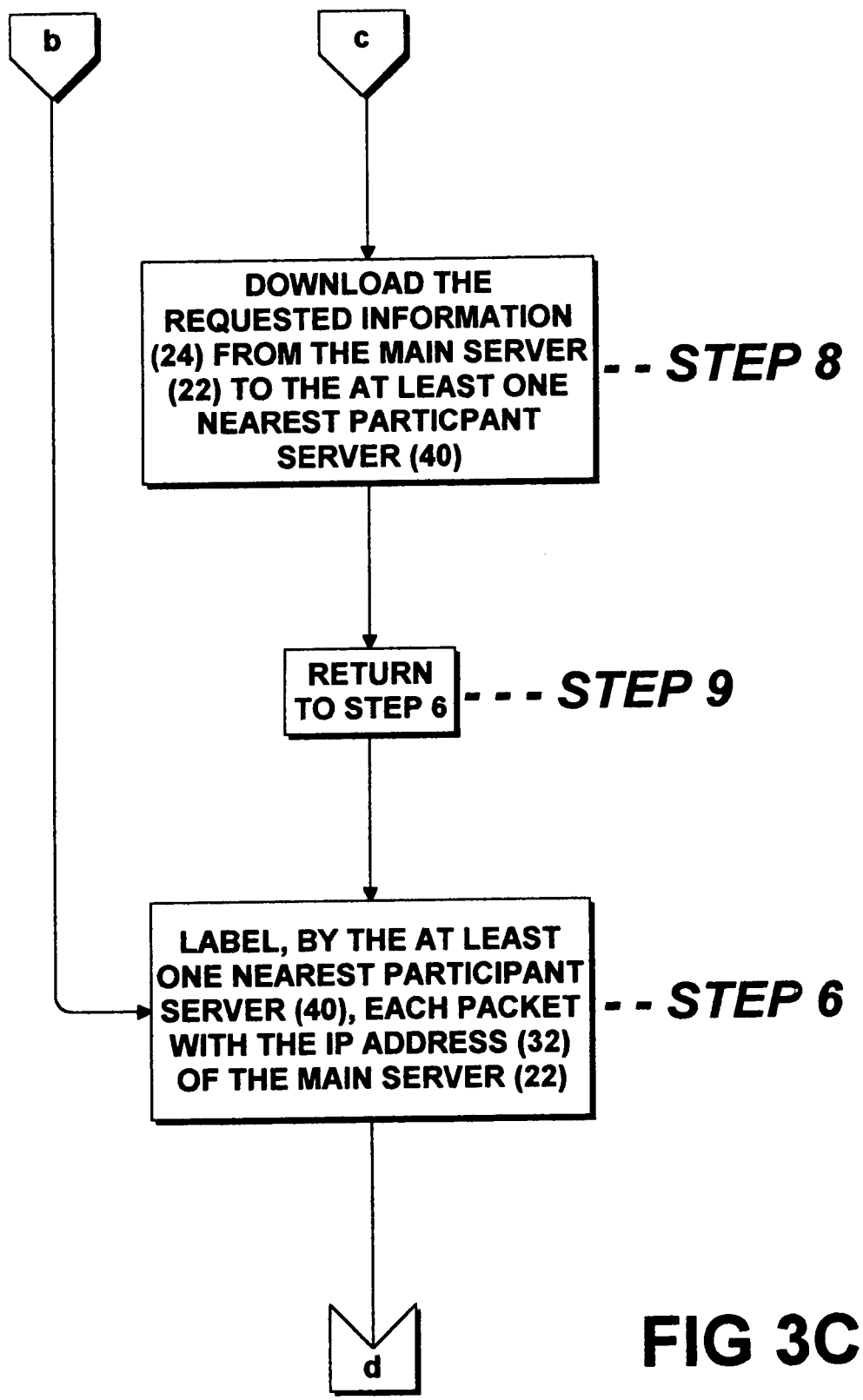

INTERNET SYSTEM

BACKGROUND OF THE INVENTION

1. Field of the Invention

The present invention relates to a system. More particularly, the present invention relates to an Internet system.

2. Description of the Prior Art

Many business and scientific organizations in the United States which use more than one computer in their operations couple the computers together through a network.

The network permits the computers to be islands of processing which may share resources or data through communication over the network. The data which may be communicated over the network may take the form of programs developed on a user's computer, data file created on a user's computer, electronic mail messages, and other data messages and files which may be generated or modified by a user at a user's computer.

Typically, the user's computer includes an operating system for controlling the resources of the user's computer, including its central processing unit ("CPU"), memory (both volatile and non-volatile memory), and computer peripherals such as printers, modems, and other known computer peripheral devices. The user typically executes application programs and system services to generate data files or programs.

Most computers are coupled to a network through a network communications printed circuit card which is typically resident within each computer system. This communications card typically includes processors, programs, and memory to provide the electrical signals for transmission of data and implement the protocol which standardizes the messages transmitted through a network.

To communicate data from a user's application program or operating system service, a protocol stack is typically implemented between the communication card for the network and the operating system services and application programs. The typical protocol stack used on most open networks is a Transport Control Protocol/Internet Protocol ("TCP/IP").

The TCP/IP stack includes a transport layer which divides a data stream from an application program or service into segments and which adds a header with a sequence number for each segment.

The TCP segments generated by the transport layer creates a packet having a packet header and a data portion. The data portion contains the TCP segment and the packet header contains a source address identifying the computer sending a message and a destination address identifying the computer for which the message is intended. The IP layer also determines the physical address of the destination computer or an intermediate computer, in some cases, which is intended to receive the transmitted message.

The packet and the physical addresses are passed to a datalink layer. The datalink layer typically is part of the program implemented by a processor on the communication card and it encapsulates the packet from the IP layer in a datalink frame which is then transmitted by the hardware of the communication card. This datalink frame is typically called a packet.

At the destination computer, the communication card implements the electrical specification of a hardware communication standard, such as Ethernet, and captures a data message from a source computer, with the word "message" henceforth including the data entities packet and datalink frame. The datalink layer at the destination computer discards the datalink header and passes the encapsulated packet to the IP layer at the destination computer.

The IP layer at the destination computer verifies that the packet was properly transmitted, usually by verifying a checksum for the packet. The IP layer than passes the encapsulated TCP segment to the transport layer at the destination computer. The transport layer verifies the checksum of the TCP message segment and the sequence number for the TCP packet. If the checksum and TCP sequence number are correct, data from the segment is passed to an application program or service at the destination computer.

Modern information networks, e.g. the Internet, use servers to store documents. In the World Wide Web (web), these documents are addressed by uniform resource locators (URLs). URLs specify the protocol by a prefix in the URL, such as http:// for Hyper Text Transfer Protocol, the host in the Internet where the document is stored, and the address of the document within the host. The Web is thus not a single protocol, but a combination of several protocols united by a common addressing scheme, i.e. the URL.

The tremendous continuing growth of the Web makes it necessary to have intermediate servers which perform caching (store documents locally, such that the documents may be quickly accessed from the local file system, instead of being retransferred again from the original server. Such servers (see, for example A. Luotonen, K. Atlis, *World Wide Web Proxies*, Proceedings of First International World-Wide-Web Conference, Geneva 1994) are referred to as caching proxy servers, or proxies for short. See, also A. Chakhuntod, P. Danzig, C. Neerdaels, M. Schwartz, K. Worrell,*A Hierarchical Internet Object Cache*, USENIX 1996 ANNUAL TECHNICAL CONFERENCE, http://usenix.org/publications/library/proceedings/sd96/danzig.html). Proxies reduce network load, and shorten response times to the user.

The operation of a prior art proxy server 10 can best be seen in FIG. 1, and as such, will be discussed with reference thereto.

When a client 12 requests a new document from the proxy server 10, the proxy server 10 copies the document from the origin server 14 to its local file system in addition to sending the document to the client 12. When another requests comes for the same document, the proxy server 10 returns the document from the cache 16, if the cached copy is still up to date. If the proxy server 10 determines that the document may be out of date, it performs an up-to-date check from the remote origin server 14 and refreshes the document, if necessary, before sending it to the client 12.

Numerous innovations for network related systems have been provided in the prior art that will be described. Even though these innovations may be suitable for the specific individual purposes to which they address, however, they differ from the present invention.

A FIRST EXAMPLE, U.S. Pat. No. 5,463,735 to Pascucci et al. teaches a network system having a wide variety of applications and particularly applicable to facilities management systems that includes network controllers which continuously process data related to building and industrial, environmental, security and other automated system controls. Each network controller has a network address indicative of a communication link to which the network controller is connected, a local address and a node drop ID to determine whether the network controller is a configured or non-configured device. Data stored in an archive device is downloaded to a destination network controller in the absence of a routing table in the destination network controller by transmitting a download request message from the archive device to an intermediate network controller with a routing table. The intermediate network controller assumes control of the download request by transmitting the message to the destination controller. The destination controller acknowledges receipt of the message by transmitting an acknowledge message back to the intermediate network controller, which passes the acknowledge message to the archive device in accordance with the routing information stored in the intermediate network controller. Thus, as certain network controllers are connected, disconnected or disabled during the operation of the network, the control of a process is not interrupted. Additionally, the network controllers are not configured to store large amounts of routing data because a path to a device can be established through other controllers with routing information.

A SECOND EXAMPLE, U.S. Pat. No. 5,727,159 to Kikinis teaches a system wherein relatively low-end-computers, such as portable, battery-powered computers ordinarily incapable of Internet browsing functions may be used to browse the Internet. The enhanced computing ability for such portables is provided by a unique arrangement having a Proxy-Server with adequate computing power for all World Wide Web (WWW) browsing and downloading functions, and further capable of transposing downloaded files to alternative, low-information-density form suitable for rapid processing and display by connected portable and other low-end computers. In some embodiments the data link from the connected low-end units is a TCP/IP pipe, supporting TCP/IP protocol, but not the many sophisticated extensions usually associated with TCP/IP. In embodiments wherein battery-powered units are used, connected to the Proxy-Server, battery life is exhibited far beyond what would be expected for a battery-powered computer with computing power for browsing the Internet directly.

A THIRD EXAMPLE, U.S. Pat. No. 5,754,857 to Gadol teaches a system and method for automating workflow by distributing the tasks required for the execution of said workflow over servers and clients connected on a network. The disclosed system and method allow the stages of the workflow to be performed asynchronously, meaning that, once a workflow initiated by a user has been initiated by a database server, the stages of the workflow can be executed on respective network clients without further interaction with the server (i.e. without requiring a stateful connection between the clients and servers). This is accomplished through the use of a workflow courier that embodies all programs (encompassing rules governing the execution of the workflow) and forms needed by clients to complete stages of the workflow. The workflow courier also stores workflow state information that indicates which stages of the workflow have been completed. The executable programs are written in the platform-independent Java programming language and are therefore executable on any computer that has an installed Java browser. After each stage is executed, the client executing that stage updates the workflow courier and transmits the updated workflow courier to a client having an associated user who is authorized to perform the next step in the workflow. The updated state information indicates to the recipient of the workflow which stages remain to be completed.

A FOURTH EXAMPLE, U.S. Pat. No. 5,862,344 to Hart teaches apparatus and methods for providing processing system network connectivity, and more particularly, for routing data packets between at least two processing system networks. A first memory for storing at least one address for each of the networks, and a second memory for storing selectively at least one address for particular ones of the networks, are provided. A control circuit for routing a received data packet from a source network to a destination network is also provided. The control circuit utilizes a destination address which was retrieved from one of the first memory and the second memory, in response to a determination as to whether at least one address corresponding to the destination network is stored in the second memory.

A FIFTH EXAMPLE, U.S. Pat. No. 5,864,852 to Loutonen teaches a proxy server, wherein variable length URLs are digested and thereby homogenized, such that each URL is converted to a URL fingerprint that has a unique identity and a same fixed size. The URL fingerprint is used to map the URL to a proxy server cache directory structure. A unique file name may also be generated from the URL fingerprint for each URL. The same bits are used in the file name, such that any given file can be remapped later to a directory structure that had been expanded or collapsed, so that the first bits are not unique to a particular hierarchy. A unique cache information file is included in the directory to store document-related information for each other file in the directory for quick access. Accordingly, the invention provides an addressing and cache organization scheme that allows quick access to documents that contain all the relevant information for each of the URLs.

A SIXTH EXAMPLE, U.S. Pat. No. 5,892,903 to Klaus teaches a system and method for detecting security vulnerabilities in a computer network. The system includes an IP spoofing attack detector, a stealth port service map generator, a source port verifier, source routing verifier, an RPC service detector and a Socks configuration verifier. Each of these verifiers make be operated separately or as a group to detect security vulnerabilities on a network. Each verifier may be programmed to exhaustively test all ports of all computers on a network to detect susceptibility to IP spoofing attacks, access to services with little or no authorization checks or misconfigured routers or Socks servers. The detected vulnerabilities or the location of services having little or no authorization checks may be stored in a table for reference by a network administrator. The service map generated by the stealth service map generator may be used to identify all service ports on a network to facilitate the operation of the other verifiers which send service command messages to service ports to detect their accessibility. A graphic user interface (GUI) may be used to provide input and control by a user to the security verifiers and to present options and display information to the user.

A SEVENTH EXAMPLE, U.S. Pat. No. 5,913,040 to Rakavy et al. teaches methods and apparatus for selecting advertisements and other information from a computer network database based on user defined preferences and transmitting the selected advertisement in background mode over a communications link between the computer network and a local computer with minimal interference with other processes communicating over the communications link. This method includes monitoring the communications link and transmitting portions of the advertisement when the communications link line utilization is below a preestablished threshold. Methods and apparatus are also provided for displaying or otherwise presenting the selected advertisements on the user's computer. Additional methods and apparatus are provided for selecting and presenting information stored on a local storage media based on user defined preferences.

It is apparent that numerous innovations for network related systems have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an Internet system that avoids the disadvantages of the prior art.

ANOTHER OBJECT of the present invention is to provide an Internet system that is simple and inexpensive to manufacture.

STILL ANOTHER OBJECT of the present invention is to provide an Internet system that is simple to use.

YET ANOTHER OBJECT of the present invention is to provide an Internet system that has the advantages of multicasting, such as lower server and bandwidth costs, but without multicasting supporting hardware.

STILL YET ANOTHER OBJECT of the present invention is to provide an Internet system that is fast and flexible, by virtue of the number of participant servers can be changed dynamically with little cost compared to upgrading the main server.

YET STILL ANOTHER OBJECT of the present invention is to provide an Internet system that relies on the fact that multicasting equipment is expensive and ISP's are reluctant to upgrade, and unless most of the net is equipped with multicasting machines, multicasting won't operate efficiently.

STILL YET ANOTHER OBJECT of the present invention is to provide an Internet system that provides safety to the participant servers in the network against attacks, such as denial of service attacks, because their IP addresses are not revealed to clients and thus hackers.

BRIEFLY STATED, YET STILL ANOTHER OBJECT of the present invention is to provide an Internet system. The system includes a main server and at least one participant server. The main server stores information to be requested over the Internet by a client so as to form a request for information and has an IP address. The at least one participant server has an IP address and electrically communicates with the main server. The at least one participant server does not receive the request for information from the client, but rather the main server receives the request for information over the Internet from the client and requests over the Internet that the at least one participant server send the requested information over the Internet back to the client. If the at least one participant server does not have the requested information, the requested information is downloaded from the main server to the at least one participant server. When the at least one participant server sends the requested information over the Internet back to the client, the at least one participant server assigns to the requested information the IP address of the main server and not the IP address of the at least one participant server.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 2 is a block diagram of the operation of the present invention; and

FIGS. 3A–3D are a process flow for using the present invention.

LIST OF REFERENCE NUMERALS UTILIZED IN THE DRAWING

Prior Art

Figure 1:
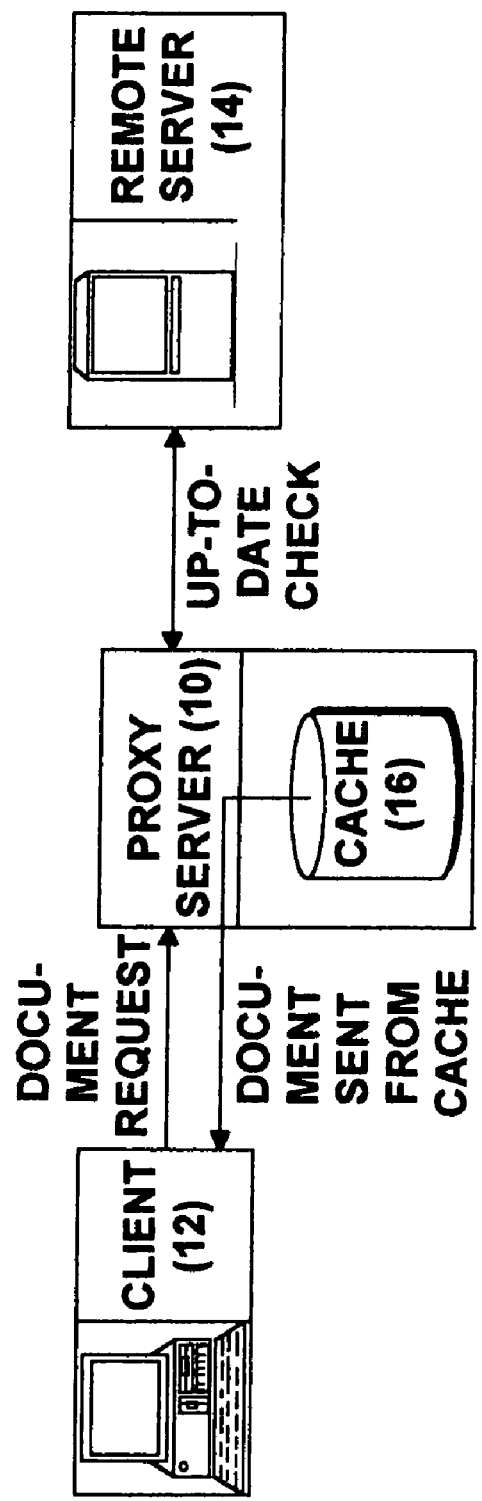
FIG. 1 is a block diagram of the operation of a prior art proxy server.

10 prior art proxy server
12 client
14 origin server
16 cache

Present Invention

20 Internet system of the present invention
22 main server for storing information 24 to be requested over Internet 26 by client 28 so as to form a request for information 30
24 information to be requested over Internet 26 by client 28 so as to form a request for information 30
26 Internet
28 client
30 request for information
32 IP address of main server 22
34 at least one participant server
36 IP address of at least one participant server 34
38 IP address of client 28
40 at least one nearest participant server of at least one participant server 34.

DETAILED DESCRIPTION OF THE PREFERRED EMBODIMENT

Referring now to the figures, in which like numerals indicate like parts, and particularly to FIG. 2, the Internet system of the present invention is shown generally at 20.

The Internet system 20 comprises a main server 22 for storing information 24 to be requested over the Internet 26 by a client 28 so as to form a request for information 30 and having an IP address 32.

The Internet system 20 further comprises at least one participant server 34 having an IP address 36 and electrically communicating with the main server 22.

The at least one participant server 34 does not receive the request for information 30 from the client 28, but rather the main server 22 receives the request for information 30 over the Internet 26 from the client 28 and requests over the Internet 26 that the at least one participant server 34 send the requested information 30 over the Internet 26 back to the client 28, and if the at least one participant server 34 does not have the requested information 30, the requested information 30 is downloaded from the main server 22 to the at least one participant server 34.

When the at least one participant server 34 sends the requested information 24 over the Internet 26 back to the client 28, the at least one participant server 34 assigns to the requested information 24 the IP address 32 of the main server 22 and not the IP address 36 of the at least one participant server 34.

The main server 22 is a TCP/IP server that assigns jobs to the at least one participant server 34 dynamically without relocating the client 28 using neither HTTP nor HTML commands so as to take relocating process away from top networking OSI layers to 3rd level of Internet working OSI that is IP so as to enable starting downloading of the requested information 24 from one of the at least one participant servers 34 and finishing the downloading from another of the at least one participant server 34 without ever noticing server alteration.

The top networking OSI layers are at least one of TCP, HTTP, and application level.

Figure 3A:
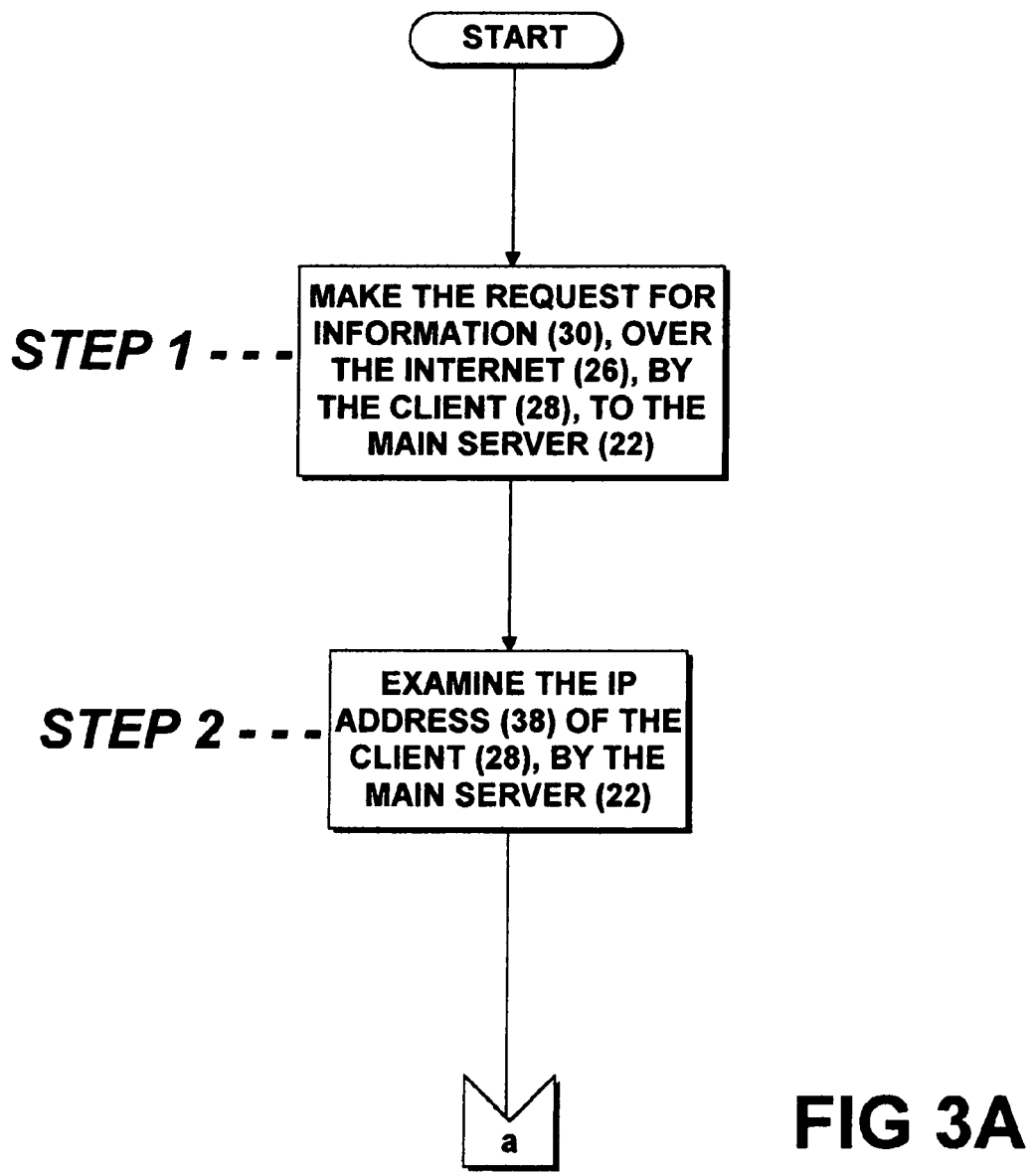
Figure 3B:
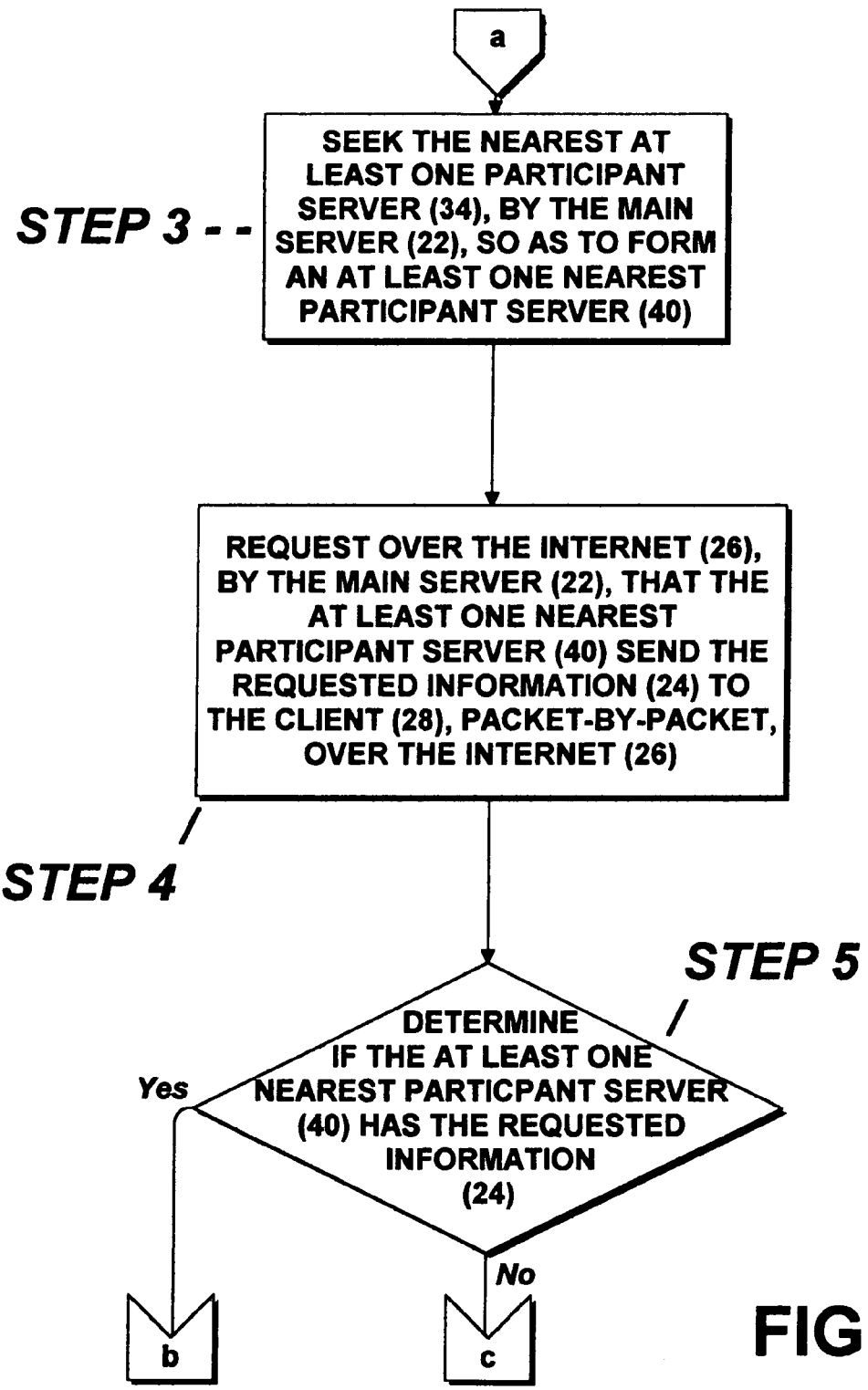
Figure 3D:
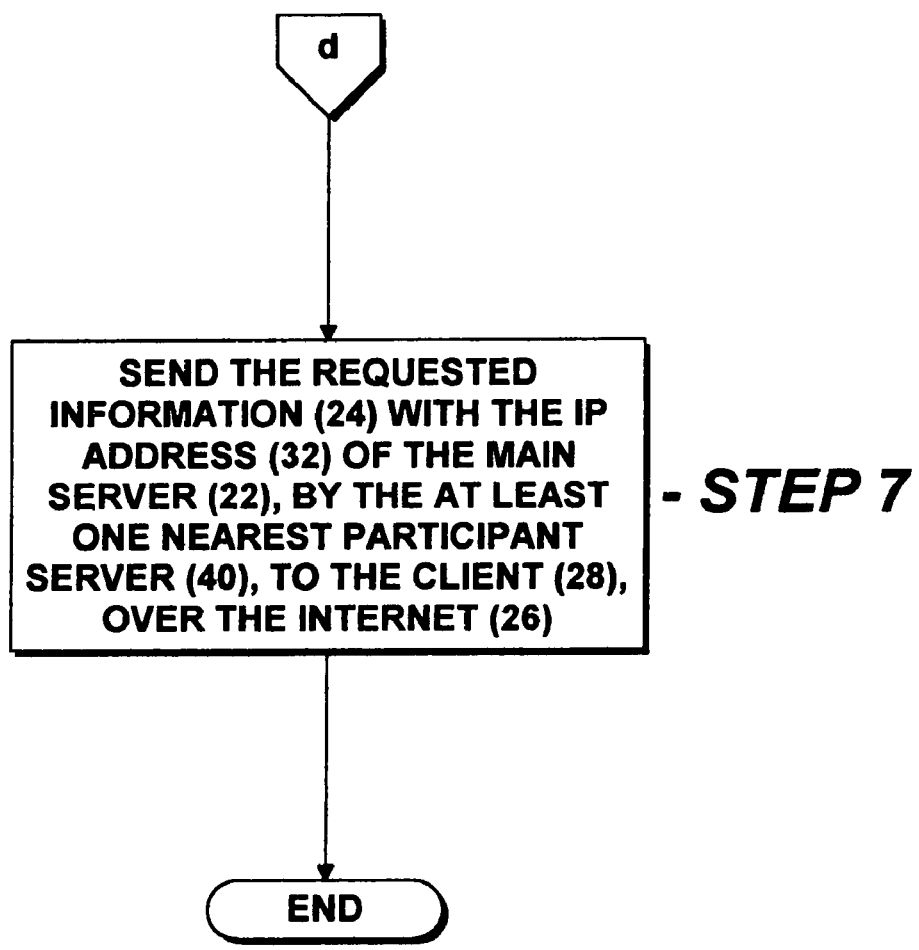

The method for using the Internet system 20 can best be seen in FIGS. 3A–3D, and as such, will be discussed with reference thereto.

STEP 1: Make the request for information 30, over the Internet 26, by the client 28, to the main server 22 and not to the at least one participant server 34; making the request for information 30 to the at least one participant server 34 the normal behavior of today's networking equipment and software.

STEP 2: Examine an IP address 38 of the client 28, by the main server 22.

STEP 3: Seek the nearest at least one participant server 34, by the main server 22, so as to form an at least one nearest participant server 40.

STEP 4: Request over the Internet 26, by the main server 22 acting like an orchestra leader, that the at least one nearest participant server 40 send the requested information 24 to the client 28, packet-by-packet, over the Internet 26.

STEP 5: Determine if the at least one nearest participant server 40 has the requested information 24.

STEP 6: Label, by the at least one nearest participant server 40, each packet with the IP address 32 of the main server 22, which enables the client 28 which has a port open only for main server addresses to accept said packets, if answer to STEP 5 is yes.

STEP 7: Send the requested information 24 with the IP address 32 of the main server 22, by the at least one nearest participant server 40, to the client 28, over the Internet 26.

STEP 8: Download the requested information 24 from the main server 22 to the at least one nearest participant server 40, which will distribute the load of the main server 22 to the at least one nearest participant server 40 when lacking multicasting so as to save costs, by virtue of the at least one nearest participant server 40 being relatively easy and inexpensive to add as compared to clustering more servers to the main server 22, if answer to STEP 5 is no.

STEP 9: Return to STEP 6.

The step of making the request for information 30, over the Internet 26, by the client 28, to the main server 22 includes making the request for at least one of a streaming video and an audio, over the Internet 26, by the client 28, to the main server 22.

The step of seeking the nearest at least one participant server 34, by the main server 22, so as to form an at least one nearest participant server 40 includes seeking the nearest at least one participant server 34, by the main server 22, so as to form the at least one nearest participant server 40 that has the most bandwidth and CPU and other serving requirements needed to furnish the requested information 24 to the client 28.

It will be understood that each of the elements described above, or two or more together, may also find a useful application in other types of constructions differing from the types described above.

While the invention has been illustrated and described as embodied in an Internet system, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An Internet system, comprising:
    a) a main server for storing information to be requested over the Internet by a client so as to form a request for information and having an IP address; and
    b) at least one participant server having an IP address and electrically communicating with said main server; said at least one participant server not receiving the request for information from the client, but rather said main server receiving the request for information over the Internet from the client and requesting over the Internet that said at least one participant server send the requested information over the Internet back to the client, and if said at least one participant server does not have the requested information, the requested information is downloaded from said main server to said at least one participant server, and when said at least one participant server sends the requested information over the Internet back to the client, said at least one participant server assigns to the requested information said IP address of said main server and not said IP address of said at least one participant server.

2. The system as defined in claim 1, wherein said main server is a TCP/IP server and assign jobs to said at least one participant server dynamically without relocating the client using neither HTTP nor HTML commands so as to take relocating process away from top networking OSI layers to 3rd level of Internet working OSI that is IP so as to enable starting downloading of the requested information from one of said at least one participant servers and finishing the downloading from another of said at least one participant server without ever noticing server alteration by virtue of said at least one participant server assigning to the requested information said IP address of said main server and not said IP address of said at least one participant server.

3. The system as defined in claim 2, wherein said top networking OSI is at least one of TCP, HTTP, and application level.

4. A method for using an Internet system, comprising the steps of:
    a) making a request for information, over the Internet, by a client, to a main server of the Internet system and not to said at least one participant server;
    b) examining an IP address of the client, by said main server;
    c) seeking at least one participant server of the Internet system, by said main server, so as to form an at least one nearest participant server;
    d) requesting over the Internet, by said main server acting like an orchestra leader, that said at least one nearest participant server send the requested information to the client, packet-by-packet, over the Internet;

e) determining if said at least one nearest participant server has the requested information;

f) labeling, by said at least one nearest participant server, each packet with an IP address of said main server, which enables the client which has a port open only for main server addresses to accept said packets, if answer to step e) is yes;

g) sending the requested information with said IP address of said main server, by said at least one nearest participant server, to the client, over the Internet;

h) downloading the requested information from said main server to said at least one nearest participant server, which will distribute the load of said main server to said at least one participant server when lacking multicasting so as to save costs, by virtue of said at least one participant server being relatively easy and inexpensive to add as compared to clustering more servers to said main server, if answer to STEP 5 is no; and i) returning to step f).

5. The method as defined in claim 4, wherein said step of making a request for information, over the Internet, by the client, from the main server includes making the request for at least one of a streaming video and an audio, over the Internet, by the client, from the main server.

6. The method as defined in claim 4, wherein said step of seeking the nearest at least one participant server, by said main server, so as to form an at least one nearest participant server includes seeking the nearest at least one nearest participant server, by said main server, so as to form said at least one nearest participant server that has the most bandwidth and CPU and other serving requirements needed to furnish the requested information to the client.

* * * * *